Nov. 11, 1969  A. WINKLER ET AL  3,477,778
MOTION PICTURE CAMERA

Filed Sept. 22, 1966  4 Sheets-Sheet 1

INVENTOR.
ALFRED WINKLER
FRIEDRICH WINKLER
ANTON THEER
KURT THATE

BY

Nov. 11, 1969  A. WINKLER ET AL  3,477,778

MOTION PICTURE CAMERA

Filed Sept. 22, 1966  4 Sheets-Sheet 2

INVENTOR.
ALFRED WINKLER
FRIEDRICH WINKLER
ANTON THEER
KURT THATE

BY

Nov. 11, 1969 A. WINKLER ET AL 3,477,778

MOTION PICTURE CAMERA

Filed Sept. 22, 1966 4 Sheets-Sheet 3

INVENTOR.
ALFRED WINKLER
FRIEDRICH WINKLER
BY ANTON THEER
KURT THATE

United States Patent Office 3,477,778
Patented Nov. 11, 1969

3,477,778
MOTION PICTURE CAMERA
Alfred Winkler, Munich, Friedrich Winkler, Unterhaching-Munich, and Anton Theer and Kurt Thate, Munich, Germany, assignors to Agfa-Gevaert Aktiengesellschaft, Leverkusen, Germany
Filed Sept. 22, 1966, Ser. No. 581,348
Int. Cl. G03b 17/02
U.S. Cl. 352—242                          22 Claims

ABSTRACT OF THE DISCLOSURE

The flat box-shaped body of a motion picture camera for use with film cartridges consists mainly of two mirror symmetrical plastic shells, one of which is provided with a chamber for film cartridges, with a door for affording access to the interior of the chamber, and with internal compartments which receive the parts of the camera and are concealed by the other shell when the two shells are detachably secured to each other by threaded bolts. The shells are further provided with sections which define a grip handle and the shell define a tubular socket for the lens.

---

The present invention relates to motion picture cameras, particularly to 8-mm. motion picture cameras. Still more particularly, the invention relates to improvements in the construction of the body of a motion picture camera for use with so-called slip-in film cartridges.

In many presently known motion cameras, the camera parts (including the film drive, objective mount, viewfinder optics and others) are mounted on a chassis which is thereupon installed in a unitary or composite housing or body. A drawback of such cameras is that their parts are accessible only upon complete dismantling which either involves complete removal of the chassis or taking apart the entire body into its constituents. Thus, even a minor inspection or repair job consumes much time, particularly if a certain part or group of parts is accessible only in response to separation of all elements which form the body, so that such minor jobs consume less time than the dismantling and reassembly of the body.

Accordingly, it is an important object of the present invention to provide a motion picture camera whose body is constructed or produced and assembled in such a way that each camera part which is likely to necessitate periodic inspection, repair and/or replacement will be readily accessible after spending little time for dismantling of the body.

Another object of the invention is to provide a novel and inexpensive body for a motion picture camera, particularly for an 8-mm. motion picture camera which uses film cartridges.

A further object of the invention is to provide a motion picture camera whose parts need not be mounted on a separate chassis.

An additional object of the invention is to provide a motion picture camera wherein the body itself carries all of the essential camera parts and wherein the body can be taken apart and reassembled within very short periods of time.

Still another object of our invention is to provide a motion picture camera wherein at least some parts of the optical system may be installed and retained by the body and wherein certain camera parts may serve their main or basic purpose and also perform the additional function of holding the parts of the camera body in assembled condition.

A concomitant object of the invention is to provide a body for motion picture cameras which comprises a minimal number of separable elements and wherein the parts of the motion picture camera may be installed, exposed or enclosed by resorting to rudimentary tools.

Briefly stated, one feature of our invention resides in the provision of a motion picture camera, particularly an 8-mm. motion picture camera for use with prefabricated film cartridges. The camera comprises a body having two large lateral sides and narrow front, rear, top and lower sides. The body comprises separable first and second shells abutting against each other in a plane extending between the lateral sides and preferably including the optical axis of the objective lens. At least one of the shells is provided with a hinged or fully removable door to afford access to the interior of the camera body, for example, to allow for convenient replacement of a spent battery complement if the camera is provided with an electrically powered film drive. The first shell has a cartridge-receiving chamber and a plurality of compartments arranged to accommodate at least the majority of camera parts including the components of the film drive, the film gate, lenses of the view finder, and/or others so that all or nearly all camera parts are carried by the first shell. Suitable bolts, screws or analogous fasteners are provided to detachably secure the two shells to each other whereby the second shell conceals the compartments.

The aforementioned cartridge-receiving chamber is preferably open at its outer side (i.e., at one lateral side of the camera body) and such open side of the chamber is preferably closed by one of the aforementioned doors so that the user can replace a cartridge with little loss in time.

If the movie camera is equipped with a zoom lens, the shells are preferably provided with forwardly extending semicylindrical extensions which together form a tube and can receive the zoom lens.

The novel features which are considered as characteristic of the invention are set forth in particular in the appended claims. The improved movie camera itself, however, both as to its construction and the mode of assembling the same, together with additional features and advantages thereof, will be best understood upon perusual of the following detailed description of certain specific embodiments with reference to the accompanying drawings, in which:

Figure 1:
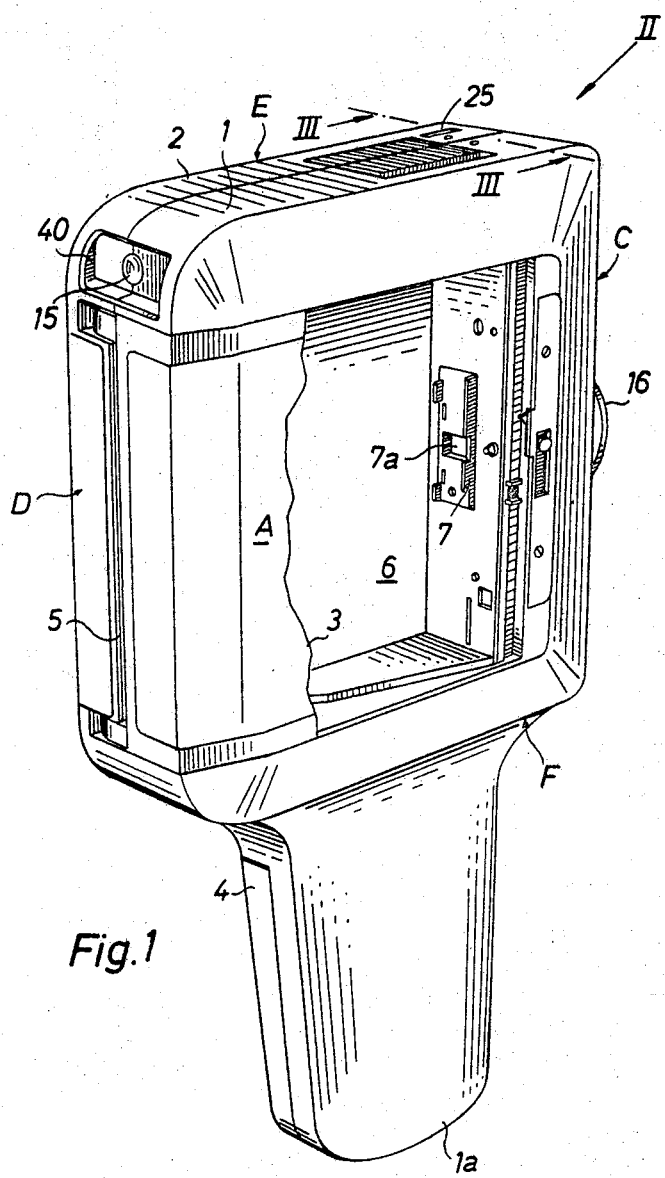
FIG. 1 is a perspective view of an 8-mm. movie camera which embodies one form of the present invention, one shell of the body being partly broken away.
Figure 2:
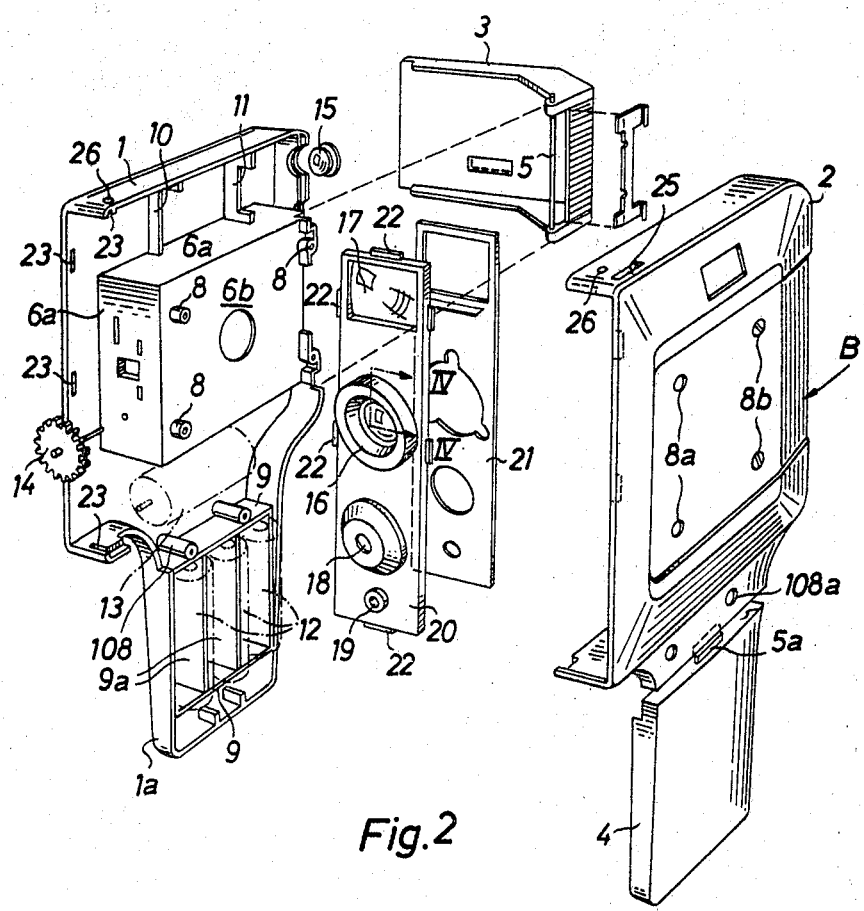
FIG. 2 is an exploded perspective view of the camera, substantially as seen from the front side of the body in the direction of arrow II in FIG. 1.

Referring to FIGS. 1 and 2, there is shown an 8-mm. motion picture camera whose body comprises two separable main portions or shells 1 and 2. The body has two relatively large lateral sides A, B and narrow front, rear, top and lower sides C, D, E, F respectively. The shells consist of synthetic plastic material and are substantially mirror symmetrical with reference to a plane which extends midway between the lateral sides A, B of the camera body and includes the optical axis of the objective lens 27 (see FIG. 4). These shells respectively comprise doors 3, 4 which are movable with reference thereto to afford convenient access to certain parts of the camera which are accommodated in the interior of the body. In the illustrated embodiment, the doors 3, 4 are hinged to the respective shells, as at 5 and 5a, but it is equally within the purview of our invention to provide doors which are removable in their entirety. Suitable latch mechanisms (not shown) are provided to normally hold the doors 3, 4 in closed and locked positions. The door 4 constitutes one section of a grip handle the other section of which is constituted by an integral portion 1a of the shell 1. The sections 1a, 4 of the grip handle extend from the lower side F of the camera body and the section 1a accommodates a set of integral partitions 9 and 9a which define compartments for the battery complement 12 of the electric film drive.

The shell 1 defines a flat box-shaped chamber 6 for a film cartridge (not shown) which is bounded by a bottom wall 6b and four side walls 6a and whose outer side is normally sealed by the door 3. The walls 6a, 6b are integral with the remainder of the shell 1, and that side wall 6a which is located behind the front side C has an integral film gate 7 which is formed thereon by an injection molding process or in another suitable way. The gate 7 is formed with an aperture 7a through which light coming from the subject and passing through the objective lens 27 can reach an unexposed film frame.

That surface of the bottom wall 6b which faces the internal surface of the shell 2 is formed with four tubular sockets 8 provided with internal threads and registering with openings 8a provided in the shell 2 to mesh with the stems of bolts 8b or analogous threaded fasteners serving to provide a readily separable connection between the two shells. Additional sockets 108 are preferably provided on the section 1a and register with openings 108a located above the door 4 to take additional fasteners, not shown. The sockets 8, 108 are preferably integral with the bottom wall 6b and section 1a. The heads of the fasteners 8b and of the fasteners extending through the openings 108a are preferably covered by a layer of leather which is applied around certain portions of the body.

The shell 1 is formed with additional internal partitions of which only the partitions 10 and 11 are shown in FIG. 2. These partitions subdivide the interior of this shell into a series of additional compartments each of which can receive one or more additional camera parts, and these partitions preferably also serve as carriers for the parts in the respective compartments. FIG. 2 shows a compartment extending between the lower side wall 6a of the film chamber 6 and the upper partition 9 and accommodating an electric motor 13 for the film drive. The other compartments may accommodate a transmission 14, the view finder lenses 15, the frames for such lenses, a light meter and other essential and/or optional camera parts. The compartments defined by the partitions 9, 9a in the section 1a of the shell 1 are readily accessible in response to opening of the door or section 4 so that the user may replace the batteries 12 by a fresh complement.

In assembling the motion picture camera, all such parts which are to be accommodated in the compartments of the shell 1 are installed in a first step. In the next step, the objective lens mount 16 and the front lens 17 of the view finder are installed in a narrow front panel 20 which is thereupon coupled to the shell 1. The front panel 20 is located at the front side C of the camera body and is provided with a window or opening 18 for admission of light to the light-sensitive resistor of the exposure control as well as with a coupling element 19 for attachment of the cable release. If the front panel 20 consists of transparent material (see FIG. 4) it is preferably assembled with a masking plate 21 which latter is provided with registering cutouts shown in FIG. 2 and permitting passage of light which has passed through the front lens 17, objective lens mount 16 and window 18. The front panel 20 is further provided with tongues 22 which can be received in complementary grooves 23 or frames of the shell 2 and/or 1 to maintain the panel 20 and masking plate 21 in requisite position. Once the parts 20, 21 are assembled with the shell 1, the lens 27, shutter (not shown), claw pull-down (not shown) and other sensitive camera parts are properly adjusted prior to attachment of shell 1 to the shell 2 by means of fasteners 8b.

Figure 3:
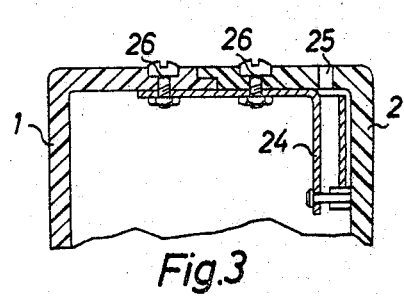
FIG. 3 is an enlarged fragmentary vertical section substantially as seen in the direction of arrows from the line III—III of FIG. 1.

The shell 2 has an opening 25 which is adjacent to the front panel 20 and extends inwardly from the top side E of the camera body to receive the foot of a conventional flash gun (not shown). In the space below the opening 25, there is provided a holder 24 (see FIG. 3) which resembles an angle bracket and engages the foot of the flash gun to hold the latter in desired position. The holder 24 forms a shoe for the foot of the flash gun and is attached to the shells 1 and 2 by screws and nuts 26 or analogous fasteners. The left-hand screw 26 of FIG. 3 will be removed if the body of the camera is to be taken apart. It will be seen that, by having its portions connected with each of the shells, the horizontal upper leg of the holder 24 which abuts against the internal surfaces of such shells performs the dual function of properly retaining the foot of a flash gun and of providing a readily separable connection between the two main components of the camera body.

Figure 4:
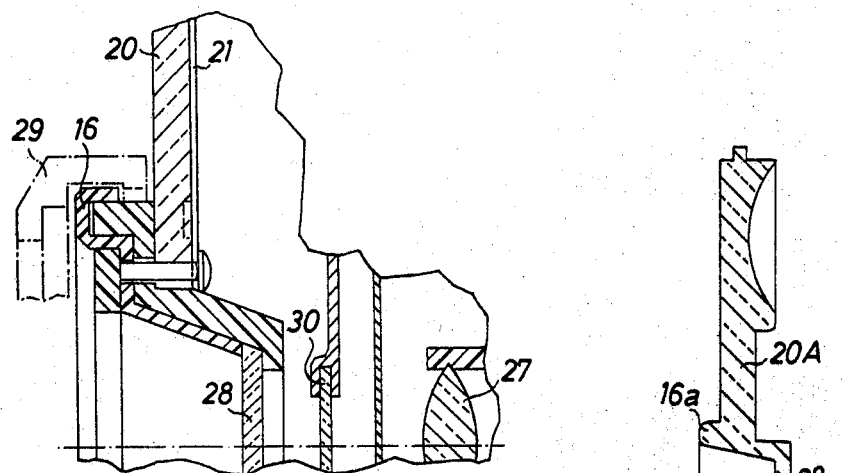
FIG. 4 is an enlarged fragmentary vertical section as seen in the direction of arrows from the line IV—IV of FIG. 2.

FIG. 4 illustrates in greater detail the manner in which the front panel 20 supports the objective lens mount 16. The objective lens 27 is of short focal length and is located behind the front panel 20 and masking plate 21. The mount 16 forms a frame for the wnidow which admits light to the lens 27 and preferably carries a transparent protecting disk 28 which is located in front of the objective lens. If desired, the mount 16 may carry a decorative ring 29 which is indicated in FIG. 4 by phantom lines. In order that the motion picture camera may be used for outdoor and indoor photography, the camera body preferably accommodates a suitable conversion filter 30 (also called type A filter) which can change its position when the foot of the flash gun is slipped through the opening 25. It is well known that such a filter will allow for use of outdoor film in making indoor movies.

Figure 5:
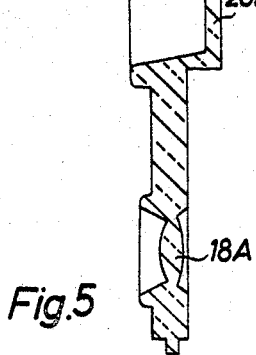
FIG. 5 is a vertical section through a modified front panel which may be utilized in the camera of FIG. 1.

The lens mount 16 and the protecting disk 28 may be made integral with the front panel to further reduce the manufacturing and assembling cost. Such modification is illustrated in FIG. 5 wherein the numeral 20A denotes a front panel of transparent plastic material provided with an integral lens mount 16a having a protecting disk 28a and a further disk 18a which can admit light to the exposure control.

FIG. 1 shows that the rear portions of the shells 1 and 2 together form a rear panel of the camera body and that the upper regions of these rear portions are provided with a recess 40 provided with a window for the rear view finder lens 15. Such recess is preferred by many movie camera users and may accommodate a conventional sunshade, not shown.

Figure 6:
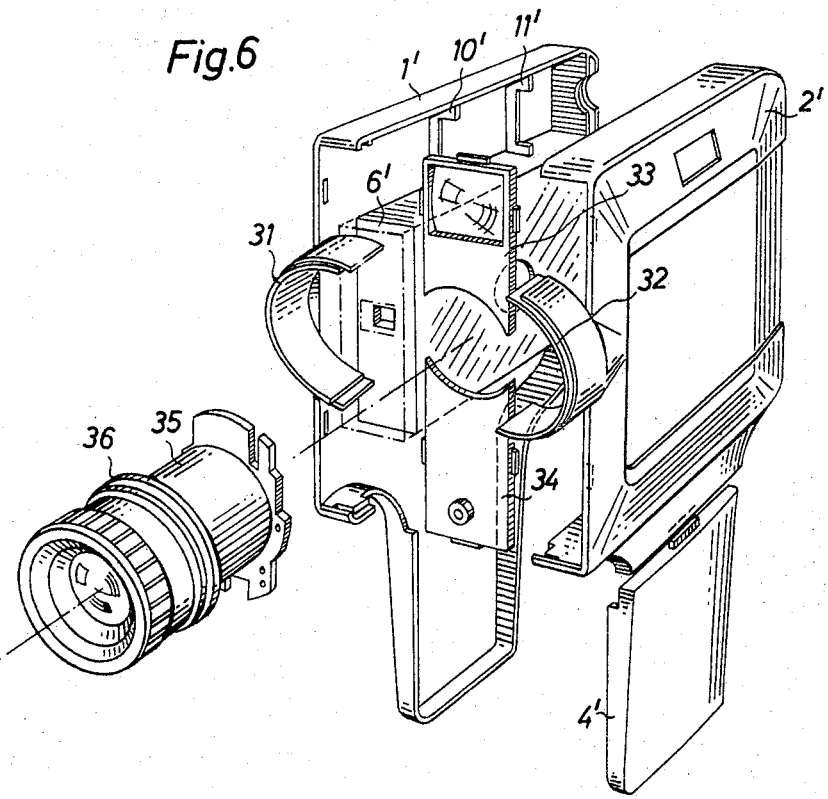
FIG. 6 is an exploded perspective view of a second 8-mm. motion picture camera.

If the motion picture camera is to be equipped with a zoom lens, its body is preferably constructed in a manner as shown in FIG. 6. All such parts which are clearly analogous to the previously described parts are denoted by similar reference numerals each followed by a prime. The body comprises a tube composed of two semicylindrical halves 31, 32 which are respectively integral with the shells 1' and 2'. The front panel 20 or 20A is replaced by a composite front panel including sections 33, 34 which define between themselves an opening for the zoom lens 35. The latter is provided with an axially reciprocable ring-shaped collar 36 which is telescoped onto the tube 31–32 to hold its halves together. The collar 36 will be slipped onto the tube 31-32 after the shells 1', 2' are properly secured to each other by faseners which are not shown in FIG. 6. A small radial screw or the like is then driven home to hold the collar 36 in its normal position. An important advantage of this collar is that it by itself provides for satisfactory retention of halves 31, 32 in abutment with each other so that such halves need not be coupled by screws. The semicylindrical half 32 of the aforementioned tube may be provided with a cylindrical extension serving as a bearing for an adjusting knob which is used to move the zoom lens 35 axially. The axis of such extension (not shown) is preferably normal to the axis of the lens 35.

Of course, our motion picture camera is susceptible of many additional modifications without departing from the spirit of the present invention. For example, the partitions 11 or 11' may be used to support the lenses of the view finders or view finder masks. Also, the partition 11 or 11' may constitute a view finder mask. The partitions in the shell 1 or 1' may be distributed in any desired manner to achieve greater economies in space and to improve the accessibility of camera parts in the respective compartments. The doors may be hinged or fully removable, or one of the doors may be hinged and the other removable in its entirety. The film gate 7 can be manufactured in a separate step of suitable metallic material and is then adjustably secured to the front side wall 6a to allow for adjustment during final checking. Suitable guide pins or posts may be provided on the shells 1, 2 or 1', 2' to insure accurate positioning prior to the application of fasteners. Similar guide pins or posts may be povided for the claw pulldown, for a detachable film gate or for other parts which are to be mounted with a high degree of accuracy.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is:

1. In a motion picture camera for use with film cartridges, a camera body having two large lateral sides and narrow front, rear, top and lower sides, said body comprising separable first and second shells abutting against each other in a plane extending between said lateral sides, at least one of said shells having a movable door to afford access to the interior of said body, said first shell having a cartridge-receiving chamber and a plurality of compartments arranged to accommodate at least the majority of camera parts including the components of the film drive; fastener means detachably securing said shells to each other so that the second shell conceals said compartments; and a grip handle including two abutting sections each forming part of one of said shells, said grip handle extending from the lower side of said camera body.

2. A structure as set forth in claim 1, wherein that section of said grip handle which forms part of said first shell defines at least one of said compartments, said one compartment being dimensioned to accommodate the battery complement of the film drive.

3. In a motion picture camera for use with film cartridges, a camera body having two large lateral sides and narrow front, rear, top and lower sides, said body comprising separable first and second shells abutting against each other in a plane extending between said lateral sides, at least one of said shells having a movable door to afford access to the interior of said body, said first shell having a cartridge-receiving chamber and a plurality of compartments arranged to accommodate at least the majority of camera parts including the components of the film drive, one of said shells having an opening extending inwardly from said top side and dimensioned to permit insertion of the foot of a flash gun; a foot-engaging shoe provided in the interior of said body below said opening and having portions affixed to each of said shells; and fastener means detachably securing said shells to each other so that the second shell conceals said compartments.

4. A structure as set forth in claim 3, wherein said shoe is an angle bracket and said portions form part of a leg abutting against the internal surfaces of said shells, and further comprising threaded fasteners fixing said leg to the respective shells.

5. In a motion picture camera for use with film cartridges, a camera body having two large lateral sides and narrow front, rear, top and lower sides, said body comprising separable first and second shells abutting against each other in a plane extending between said lateral sides, at least one of said shells having a movable door to afford access to the interior of said body, said first shell having a cartridge-receiving chamber, a plurality of compartments arranged to accommodate at least the majority of camera parts including the components of the film drive, and integral walls bounding said chamber and including a bottom wall having an outer side facing the internal surface of said second shell and provided with tubular sockets extending toward said second shell, said second shell having openings registering with said sockets; and fastener means detachably securing said shells to each other so that the second shell conceals said compartments, said fastener means extending through said openings and into said sockets.

6. A structure as set forth in claim 5, wherein said sockets are provided with tapped bores and said fasteners have external threads meshing with said sockets.

7. In a motion picture camera for use with film cartridges, a camera body having two large lateral sides and narrow front, rear, top and lower sides, said body comprising separable first and second shells abutting against each other in a plane extending between said lateral sides and a tube extending forwardly from said front side and including two semicylindrical halves each integral with one of said shells, at least one of said shells having a movable door to afford access to the interior of said body, said first shell having a cartridge-receiving chamber and a plurality of compartments arranged to accommodate at least the majority of camera parts including the components of the film drive; and fastener means detachably securing said shells to each other so that the second shell conceals said compartments.

8. A structure as set forth in claim 7, further comprising a zoom lens in said tube, said lens having an axially reciprocable ring-shaped collar telescoped onto said tube to hold said halves together.

9. A structure as set forth in claim 8, wherein said body further comprises a front panel at said front side and including two spaced sections defining between themselves an opening for a portion of said zoom lens.

10. In a motion picture camera for use with film cartridges, a camera body having two large lateral sides and narrow front, rear, top and lower sides, said body comprising separable first and second shells abutting against each other in a plane extending between said lateral sides, at least one of said shells having a movable door to afford access to the interior of said body, said first shell having a cartridge-receiving chamber and a plurality of compartments arranged to accommodate at least the majority of camera parts including the components of the film drive; fastener means detachably securing said shells to each other so that the second shell conceals said compartments; and a grip handle extending from said camera body and comprising two abutting sections each forming part of one of said shells.

11. A structure as defined in claim 10, further comprising a film gate integral with said chamber.

12. A structure as defined in claim 11, wherein said door affords access to the interior of said chamber.

13. A structure as set forth in claim 10, wherein said shells consist of synthetic plastic material.

14. A structure as set forth in claim 10, wherein said chamber is bounded by walls all of which are integral with the remainder of said first shell.

15. A structure as set forth in claim 10, wherein said first shell comprises internal partitions bounding at least some of said compartments and adapted to serve as carriers for the camera parts in the respective compartments.

16. A structure as set forth in claim 10, wherein said first shell comprises walls surrounding said chamber, one of said walls being located behind said front side of the camera body and comprising an integral film gate.

17. A structure as set forth in claim 16, wherein said walls consist of injection molded synthetic plastic material.

18. A structure as set forth in claim 10, wherein said body further comprises a front panel located at said front side and disposed between said shells, said front panel having a plurality of light-admitting windows.

19. A structure as set forth in claim 18, wherein said front panel comprises tongues extending into complementary grooves provided in at least one of said shells.

20. A structure as set forth in claim 18, further comprising a view finder lens provided in one of said windows.

21. A structure as set forth in claim 10, wherein said shells have rear portions together forming a rear panel at the rear side of said body, said rear panel having a recess and a view finder lens provided in said recess.

22. A structure as set forth in claim 10, wherein said shells are substantially mirror symmetrical with reference to a plane extending midway between the lateral sides of said body.

References Cited

UNITED STATES PATENTS

| | | | |
|---|---|---|---|
| 1,962,031 | 6/1934 | Porter | 352—72 |
| 2,252,563 | 8/1941 | Githens | 352—242 |
| 3,066,588 | 12/1962 | Hell | 95—11 |
| 3,256,793 | 6/1966 | Denk | 95—11 |

NORTON ANSHER, Primary Examiner

MONROE H. HAYES, Assistant Examiner